United States Patent Office 3,140,270
Patented July 7, 1964

3,140,270
LIGHT-SENSITIVE HIGH MOLECULAR
POLYURETHANE COMPOUNDS
Wilhelm Thoma, Leichlingen, and Heinrich Rinke, Leverkusen, Germany, assignors to Farbenfabriken Bayer Aktiengesellschaft, Leverkusen, Germany, a corporation of Germany
No Drawing. Filed Aug. 17, 1959, Ser. No. 833,921
Claims priority, application Germany Aug. 21, 1958
11 Claims. (Cl. 260—47)

This invention relates to light-sensitive high molecular compounds. More particularly, the invention is concerned with light-sensitive high molecular compounds formed from polyurethanes, a method for producing the new light-sensitive high molecular compounds and certain applications of the same.

It is known to cross-link plastics with high energy content rays, such for example as X-rays, gamma rays and electron beams. It is for example possible in this way to raise the softening point of polyethylene. It is also known that modified polyvinyl alcohols containing several cinnamoyl or chalcone radicals can be cross-linked and made insoluble with actinic light, for example with ultra-violet light.

It is an object of the present invention to provide light-sensitive high molecular compounds which are eminently suitable for the preparation of difficult reproductions. Another object is to provide a process for producing these new light-sensitive high molecular compounds on the basis of polyurethanes. A further object is to provide a method of converting these light-sensitive high molecular compounds into cross-linked insoluble products. A further object is to provide a new reproduction technique using these light-sensitive high molecular compounds. Still further objects will appear hereinafter.

It has now been found in accordance with the present invention that high molecular compounds which can be cross-linked and thus rendered insoluble by the action of light, can be obtained by forming polyurethanes starting from bis-hydroxy alkyl ethers of bis-phenols which contain one or more —CH=CH—CO— groups in the molecule.

The invention may in other words be characterized in that in the known processes leading to polyurethanes and starting from diisocyanates and glycols instead of the usual polyurethane-forming glycols there are wholly or partially employed bis-hydroxy alkyl ethers of bis-phenols which contain one or more —CH=CH—CO— groups in the molecule together with diisocyanates.

bis-hydroxy polyalkyl ethers of any substituted dihydroxy chalcone can be used in the process of the present invention. That includes the reaction products of the below mentioned chalcones with 1 to 10 mols or more of ethylene oxide, propylene oxide, butylene oxide, ω-chlorohexyl-alcohol, allyl alcohol or epichlorohydrin. In the latter case the epoxy ring is opened with water thus producing hydroxy alkyl ethers of dihydroxy chalcones which contain more than two hydroxy groups and which can be used concurrently in an amount up to 5 mol percent with the bis-hydroxy alkyl ethers of dihydroxy chalcones.

As bis-phenols containing —CH=CH—CO— groups the following are mentioned as examples:

4,4'-dihydroxy chalcone, 3,4'-dihydroxy chalcone, 2,4'-dihydroxy chalcone, 2',4-dihydroxy chalcone, 2',3-dihydroxy chalcone, 2,2'-dihydroxy chalcone, 2,5'-dihydroxy chalcone, 3,4'-dihydroxy chalcone, 2',4'-dihydroxy chalcone, 2',4-dihydroxy-3-methoxy chalcone, 4,4'-dihydroxy-3-methoxy chalcone, 2,4'-dihydroxy-3-methoxy chalcone, 2,2'-dihydroxy-3-methoxy chalcone, 4,4'-dihydroxy-3-ethoxy chalcone, 2,4'-dihydroxy-3-propoxy chalcone, 4,4'-dihydroxy-3-nitro chalcone, 2,4'-dihydroxy-3-chloro chalcone.

Reference is also made to the bis-hydroxyalkyl ethers of the condensation products of hydroxy cinnamic acid derivatives and phenol alcohols or phenol amines, i.e. to compounds of the following formulae, in which $x$ represents 0 or a whole number and R can represent a hydrogen atom or an alkyl radical:

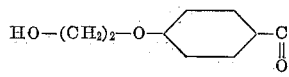

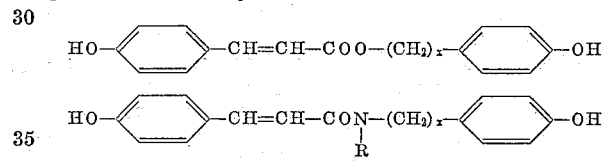

In the production of light-sensitive polyether urethanes, it is particularly advantageous to use those bis-phenols or their hydroxyalkyl ethers which contain several —CH=CH—CO groups in the molecule, whereby the quantity of the component necessary to produce the subsequent light cross-linking of the polyurethane can be greatly reduced. By way of example, there are mentioned the hydroxyalkylated condensation products of terephthalic or isophthalic dialdehydes and 2-, 3- or 4-hydroxyacetophenones, which may have the formula

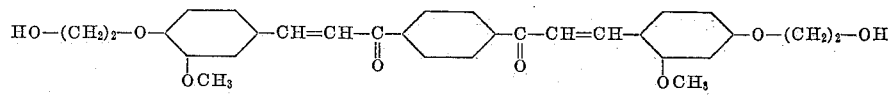

the hydroxyalkylated condensation products of 1 mol of a diacetyl benzene and 2 mols of an aromatic hydroxyaldehyde, which may have the formula

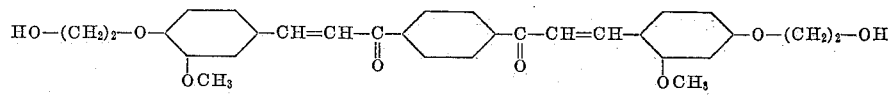

The polyurethanes obtained according to the invention, especially after they have been shaped to form films, foils, or filaments, become sparingly soluble or insoluble under the action of actinic light, for example ultra-violet light, X-rays, in the light of an arc lamp or even in the light of a relatively strong incandescent lamp, and their properties are decisively modified.

In general, any bis-hydroxy alkyl ether including the and also hydroxyalkylated dihydroxydistyryl ketones, starting for example from 2,2'-, 3,3'- or 4,4'-dihydrodistyryl ketones or 4,4'-dihydroxy-3,3'-dimethoxydistyryl ketone, which may have the formula

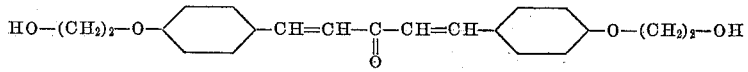

It is also possible to employ for the present process monooxy chalcone such as 4-oxy chalcone, 4'-oxy chalcone, 3-oxy chalcone, 3'-oxy chalcone when reacted with epichlorhydrin and thereafter with water to provide for two hydroxyl groups in the modified monooxy chalcone.

Together with the before-mentioned bis-hydroxy alkyl ethers of bis-phenols containing —CH=CH—CO— groups in the molecule it is possible to employ other glycols known in the art to form polyurethanes.

To give an example the following should be mentioned: Ethylene glycol, diethylene glycol, triethylene glycol, polyethylene glycol, propylene glycol, dipropylene glycol, polypropylene glycol, polytetrahydrofuran, 1,3-butane diol, 1,4-butane diol, 2-dimethylpropane diol-1,3, hexamethylene glycol, thiodiglycol, m-xylylene glycol, p-xylylene glycol, dihydroxy ethylation products of bis-phenols and many others.

These additional phenols should only be employed in such an amount that the final product contains at least 1% by weight of —CH=CH—CO— groups if the product for instance in form of fibres or foils is to be subjected to the action of light to improve the mechanical characteristics of the fibre or foil. If the product is to be employed for photo-mechanical reproduction purposes it should contain at least 5% by weight of

—CH=CH—CO— groups.

Again it is possible to employ a small amount up to 5 mol percent of a tri- or higher functional glycol such as glycerine, trimethylol propane, or pentaerythritol.

Examples of diisocyanates suitable for the production of the polyurethanes include tetramethylene diisocyanate, pentamethylene diisocyanate, hexamethylene diisocyanate, 2,4-toluylene diisocyanate, 2,6-toluylene diisocyanate, m-phenylene diisocyanate, p-phenylene diisocyanate, cyclohexylene diisocyanate, m-xylylene diisocyanate, p-xylylene diisocyanate, 1,4-naphthylene diisocyanate, 1,5-naphthylene diisocyanate, 4,4'-diphenyl methane diisocyanate, and 4,4'-diphenyl dimethyl methane diisocyanate. Any alkoxy-, chloro- or nitro-substituted derivatives of these diisocyanates can likewise be employed, such as 3-nitro phenylene diisocyanate-1,4,3-ethoxy phenylene diisocyanate-1,4, and 3-chlorophenylene diisocyanate-1,4.

From these starting materials the polyurethanes are prepared by known processes which are summarized in Angewandte Chemie A 59, 1947, pages 258–262. The diisocyanates and the glycols are normally employed in about equivalent amounts. It is, however, possible to use the diisocyanate in an excess of up to 10 mol percent or to employ the glycol components in an excess of up to 10 mol percent.

Usually, the reaction is performed in a suitable solvent such as chloro benzene, o-dichlorobenzene, cyclo hexanone, toluene, xylene, anisol, nitrobenzene, 1,3,5-trichloro benzene, and glycol monomethyl ether acetate.

Reaction is performed at elevated temperature of about 60 to about 200° C. In most cases reaction is completed after not more than 1 hour.

If the light-sensitive high molecular compounds of the present invention are exposed to the action of light, their physical and chemical properties are changed more or less quickly. It is believed that these changes are the result of a cross-linking reaction involving dimerization or polymerization at the —CH=CH—CO— groups but we do not want to be restricted to any particular theory with respect to this phenomenon. A very wide range of different light sources can be used, depending on the structure of the light-sensitive high molecular weight substances. Light having a high proportion of ultraviolet rays is particularly effective. The speed and the degree of cross-linking depend upon the amount of incident light and its wavelength, the amount of the

—CH=CH—CO— groups in the polymer and also the molecular weight of the latter. The speed of the cross-linking caused by irradiation by light can be further increased by adding so-called sensitisers. Compounds from the classes comprising cyanines, triphenyl methane dyestuffs and dyestuffs of the benzanthrone, quinone or anthraquinone series can be used with particular advantage as such sensitisers. By means of these dyestuffs, the said reaction products are also sensitized with respect to visible light. The degree of cross-linking depends upon the period of incident light and the amount of

—CH=CH—CO— groups in the polymer. It can therefore be varied in a convenient manner. These substances cross-linked by the irradiation by light become insoluble, harder and less sensitive to acids and alkali and to solvents.

By the incorporation of those hydroxyalkylated bis-phenols which contain one or several

—CH=CH—CO— groups in the molecule, there are obtained films, foils or filaments from polyurethanes which are very essentially modified in their properties by comparison with those not having —CH=CH—CO— groups. These properties are especially noticeable after exposure to light. With foils, filaments, or films containing up to about 20 mol percent of components which can be optically cross-linked, the tensile strength, elongation, E-modulus and the edge-tearing strength are increased after exposure with ultra-violet light. The impact sensitivity and solubility in organic solvents are decreased. Polyurethanes with a content of more than about 20 mol percent of components which can be cross-linked optically show such a high sensitivity on irradiation with ultra-violet light that structures such as films and filaments formed therefrom cross-link in a short period of from a few seconds to several minutes and become insoluble. By incorporating bis-phenols with several —CH=CH—CO— groups it is possible to manage with smaller quantities in order to be able to obtain clear effects from the action of light.

The new materials can be used with particular advantage in the reproduction art for the manufacture of printing forms. The light-sensitive polyurethane films can also be used in the optical reproduction of circuit diagrams on metal foils. The cross-linked polyurethane films are characterised by a high resistance to hydrolysis.

Exposure to light cross-links the high molecular layers at the places reached by the light, whereas the places not reached by light remain unchanged. By aftertreatment with a developer, the unexposed places can then be removed. It is a surprising fact that the process according to the invention gives very sharp contours in the reproduction art and permits the preparation of difficult reproductions.

In this connection, it is preferable to apply the light-sensitive compound of high molecular weight to a support in the form of a solution which dries thereon as a film. Any type of solvent can be used without the suitability of the products claimed being impaired by the nature of the solvent. For example, ketones, esters, alcohols, ethers, acid amides, hydrocarbons or their halogen or nitro derivatives or mixtures of these solvents can be used. As solvent mixtures, it is also possible to use mixtures which consist of one or more of such solvents and such substances which are not capable of dissolving the light-sensitive high molecular compounds.

The application of such solvents to a support can take place in any desired manner, for example, by spraying, brushing, casting or dipping. The centrifuging process has proved to be particularly suitable, since it is possible in this way to produce a particularly uniform film, the thickness of which can be easily reproduced.

As the support for the film, it is possible to use all the materials which are usual in the reproduction art, such as for example, zinc, copper, aluminum or magnesium, their oxides, the normal bimetallic and trimetallic plates, certain types of paper and film supports which are formed with a base of organic colloids, but also other substances, such as for example, glass or plastics.

The exposure of the films prepared in this manner, is carried out with the auxiliary means and light sources which are usual in the reproduction art. Lined, screen or half-tone negatives or diapositives can be used as the original.

After the exposure, those parts of the film which are not affected by the light are dissolved out by means of a solvent. For this purpose, it is possible to use the same solvents or solvent mixtures in which the light-sensitive high molecular compounds have previously been dissolved. In certain cases, however, the composition of such a developer may be different in order to produce certain effects, such as for example a particularly gentle or a particularly rapid development of the copy. Particular effects can also be obtained, for example, by adding dyestuffs, a colouring of the copy taking place concurrently with the development. The copy thus obtained can also be subsequently dyed in order to be able to check it for any defects which may be present.

At this stage, the copy is ready for the conventional printing process. The advantage of the products of the invention as compared with those formerly used in the reproduction art is that the actual film support can be coated a long time before being actually used, without it being possible to detect any decrease in the light sensitivity or in the developing capacity of the copying layer. It is known that this is only possible a short time beforehand, for example with plates which have been coated with chromium colloids. On the other hand, the copies prepared using the products of the invention are resistant to water, acid and alkali, whereby many new applications are provided, for example in the electrotechnical field, in which it is not possible to use chromium colloids, since they are swelled or even destroyed by water, acids or alkalis, even after exposure. Moreover, the copies prepared using the products of the invention are substantially more resistant to mechanical stresses than those which have been prepared with chromium colloids. This opens up many new fields of use.

The details of the present invention will become apparent to those skilled in the art from a consideration of the following working examples which are illustrative only and in no way to be construed as limiting.

*Example 1*

9.2 g. (0.028 mol) of 4,4'-bis-(hydroxyethylether)-chalcone and 1.7 g. (0.012 mol) of triethylene glycol with 23.9% of hydroxyl groups are heated to boiling point for 2 hours under nitrogen with 7 g. of an isomer mixture of 2,4- and 2,6-toluylene diisocyanate in 40 cc. of chlorobenzene. A complete solution is initially formed at 125° C.; the polycondensate starts to separate out a little later. After cooling, the substance is decanted from chlorobenzene, the condensate is dissolved in dimethyl formamide and precipitated by introducing the solution dropwise into methanol.

The polyether urethane has a K-value of 39.4.

The polyether urethane can be cast as 3% solution in dimethyl formamide on chromium or copper foils to form films. These cross-link under the action of ultra-violet light and thus can be used for the production of printing matrices or for the production of etched circuit diagrams. The film has high resistance to scratching and a high light sensitivity. A mixture of 3 parts of dimethyl formamide and 1 part of cyclohexanone is suitable for development purposes.

If 11.17 g. of diphenyl dimethyl methane-4,4'-diisocyanate are used instead of 7 g. of toluylene diisocyanate, a condensate with a K-value of 51.2 is obtained, the exposed films of which can be developed with a mixture of cyclohexanone and methylene chloride (1:1).

The 4,4'-bis-(hydroxyethylether)-chalcone which is used is prepared as follows: 192 g. of 4,4'-dihydroxychalcone (0.8 mol) are dissolved in 800 ml. of caustic soda solution. At 50° C., 144 g. of ethylene chlorhydrin are added dropwise over a period of 1½ hours and thereafter the reaction mixture is heated for another 3 hours at 75 to 80° C. The precipitated 4,4'-bis-(hydroxyethyl ether)-chalcone is filtered off by suction after cooling, washed with dilute soda solution and the crude product is recrystallised from 2 litres of alcohol. Yield 202 g.=76.5% of the theoretical. M.P. 149–150° C.

$C_{19}H_{20}O_5$ (328)—Calculated: C, 69.5%; H, 6.1%; O, 24.4%. Found: C, 69.71%; H, 6.15%; O, 24.28%.

*Example 2*

9.2 g. (0.028 mol) of 4,4'-bis-(hydroxyethylether)-chalcone and 3.76 g. of polythioether (10.8% OH), obtained by the addition of ethylene oxide to thiodiglycol, are condensed with 7 g. of toluylene diisocyanate in 40 cc. of chlorobenzene in accordance with Example 1 and worked up. The K-value is 54.0.

The development of the film, cast from 3% dimethyl formamide solution, and exposed to light is effected with a mixture of 1 part of cyclohexanone and 1 part of methylene chloride. The sensitivity is in the region of 10 to 30 seconds.

*Example 3*

9.2 g. (0.028 mol) of 3,4'-bis-(hydroxyethylether)-chalcone and 1.7 g. of triethylene glycol (23.9% OH) are reacted with 7 g. of toluylene diisocyanate in a manner analogous to Example 1. The resulting polyether urethane (K-value is 41.3) is cast as films from 3% dimethyl formamide solution. A mixture of 1 part of dimethyl formamide and 1 part of cyclohexanone is suitable for development purposes after exposure has taken place.

The 3,4'-bis-(hydroxyethylether)-chalcone is obtained from 24 g. (0.1 mol) of 3,4'-dihydroxychalcone and 18 g. of ethylene chlorhydrin in the presence of 8 g. of caustic soda in 50 cc. of water at 75° C. Yield 92%. M.P. 132° C. after recrystallisation from alcohol.

$C_{19}H_{20}O$ (328)—Calculated: C, 69; H, 6.1. Found: C, 69.7; H, 6.3.

The 3,4'-dihyroxychalcone is prepared by the action of gaseous hydrochloric acid on a solution of 68 g. of 4-hydroxyacetophenone and 63 g. of 3-hydroxybenzaldehyde in 200 cc. of alcohol while cooling with ice. After hydrochloric acid gas has been introduced for about 4 hours, a reddish-brown precipitate is formed. This is suction-filtered, the substance is introduced into a large quantity of water, washed until neutral and the crude product is recrystallised from aqueous alcohol. Yield 77%. M.P. 247 to 248° C., after recrystallisation from alcohol and water.

$C_{15}H_{12}O_3$ (240)—Calculated: C, 75.0; H, 5.0; O, 20.0. Found: C, 74.8; H, 5.4; O, 19.9.

The diacetate $C_{19}H_{16}O_5$ melts at 116 to 117° C.

Calculated: O, 24.7; found O, 24.75.

*Example 4*

7.08 g. (0.02 mol) of 4,4'-bis-(hydroxyethylether)-distyrylketone and 2.84 g. (0.02 mol) of triethylene glycol (23.9% OH) are heated for 2 hours to boiling point with 7 g. of toluylene diisocyanate in 50 cc. of chlorobenzene. The crude polycondensate is reprecipitated from dimethyl formamide in methanol. The K-value is 45.

The films, cast from 3% solution in cyclohexanone and dimethyl formamide (1:1), are exceptionally sensitive to light. Exposure for 1 second with a mercury lamp or 5 seconds with a 300 watt incandescent lamp is sufficient for cross-linking purposes. Development is effected with a mixture of glycol monomethyl ether acetate and methylene chloride (1:3).

A likewise very light-sensitive polyether urethane (K-value is 51.2) is obtained by using 7.26 g. of octaethylene glycol (mol weight 363) and 6.9 g. of toluylene diisocyanate.

The distyryl ketone-4,4'-bis-hydroxyethylether is prepared as follows: 53.2 g. of 4,4'-dihydroxy-distyrylketone (0.2 mol) are dissolved with 16 g. of caustic soda in 100 cc. of water. At 50° C., 36 g. of ethylene chlorhydrin are added and the reaction mixture is kept for another 3 hours at 75 to 80° C. This is suction-filtered, washed with dilute soda solution and recrystallised from 12 to 14 cc. of alcohol/gram of substance. Yield 80%. M.P. 163 to 164° C.

$C_{21}H_{22}O_5$ (354)—Calculated: C, 71.2; H, 6.2; O, 22.6. Found: C, 71.36; H, 6.33; O, 22.52.

*Example 5*

6.37 g. (0.018 mol) of 4,4'-bis-(hydroxyethylether)-distyryl-ketone and 2.29 g. (0.022 mol) of 2,2-dimethyl-propane-1,3-diol are heated for 2 hours to boiling point with 7 g. of toluylene diisocyanate in 50 cc. of chlorobenzene. The poly-condensate is isolated in a manner analogous to Example 1. The K-value is 52.4.

Films which are sensitive to light and which become insoluble after exposure for 1 second with a mercury lamp for cast from a 3% solution in cyclohexanone and dimethyl formamide (1:1). Development is effected with cyclohexanone and the colouring of the image is performed with a crystal violet solution in glycol monomethyl ether acetate and methylene chloride (1:3).

*Example 6*

A mixture of 119 parts by weight of butane-1, 4-diol, 22.96 parts by weight of 4,4'-bis-(hydroxyethylether)-chalcone (see Example 1) and 230.26 parts by weight of hexane-1,6-diisocyanate is placed in a cylindrical glass vessel 25 cm. high and 6.5 cm. in diameter, which vessel can be closed with a rubber stopper and is provided with a spirally bent metal stirrer, thermometer, gas supply and discharge pipes. The mixture is carefully heated electrically while stirring and passing in a very weak stream of nitrogen. When the temperature rises to about 55° C., the heating is switched off and the reaction mixture is left while continuing to stir. In another 15 minutes, the internal temperature has risen to 80° C., the initially insoluble 4,4'-bis-(hydroxyethylether)-chalcone having completely dissolved. The speed of the stirrer, which previously was 60 r.p.m., is now increased to 100 r.p.m.

The temperature then rises in 5 to 8 minutes to 202 to 204° C, and is kept within this range for 10 minutes by switching the heater on again. By a brief evacuation, during which the stirrer is to run very slowly, a completely bubble-free slightly yellowish melt which can easily be spun into filaments after transfer to a spinning device is obtained. Following the spinning process, these filaments can be stretched in the usual way from 1.1 g./den. to four times this value while cold.

*Example 7*

70.8 parts by weight of 4,4'-bis-(hydroxy ethyl ether)-distyryl ketone and 33.5 parts by weight of 1,4-cyclohexylene diisocyanate are heated to boiling for two hours in 500 cm.³ of chlorobenzene. The polycondensate starts to separate out after cooling. The substance is decanted from the solvent. The condensate is dissolved in dimethyl formamide and precipitated by introducing the solution dropwise into methanol.

The polyether urethane has a K-value of 43.

What is claimed is:

1. A process for the production of light-sensitive polyurethanes which comprise reacting a monomeric organic diisocyanate with a glycol selected from the group consisting of:

(a)

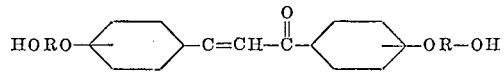

(b)

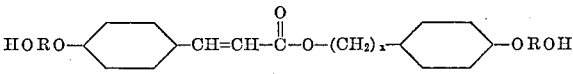

wherein $x$ has a value from 0 to a whole number (c)

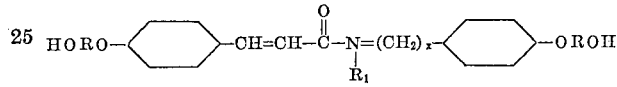

wherein $R_1$ is selected from the group consisting of hydrogen and alkyl, and $x$ has a value from 0 to a whole number (d)

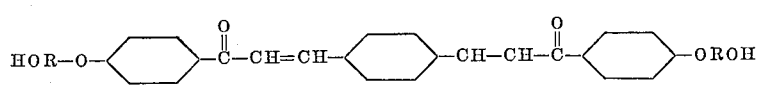

(e)

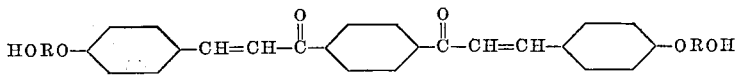

and (f)

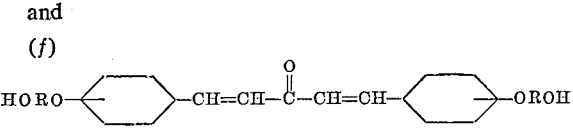

wherein the R substituent of the foregoing —OROH groups is alkylene and wherein the benzene nuclei which are substituted by said —OROH groups may be further substituted by a member selected from the group consisting of chloro, nitro, and lower alkoxy groups, said reaction being conducted at a temperature of from 60–200° C. to form a polyurethane which contains at least 1% by weight of

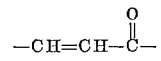

groups.

2. The process of claim 1 wherein the said glycol and the said diisocyanate are employed in substantially equivalent amounts.

3. The process of claim 1 wherein the reaction is conducted in the melt.

4. A cross-linked polyurethane which is prepared by exposing to a light source the light-sensitive polyurethane which is produced by the process of claim 1.

5. A process for the production of light-sensitive compounds which comprises reacting at a temperature of 60–200° C. a mixture of substantially equivalent amounts of toluylene diisocyanate and triethylene glycol with sufficient bis-hydroxy ethyl ether of 4,4′-dihydroxy-chalcone so that the product contains at least 1% by weight of

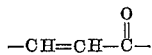

groups.

6. A process for the production of light-sensitive compounds which comprises reacting a mixture of substantially equivalent amounts of triethylene glycol and toluylene diisocyanate with sufficient distyryl ketone bis-hydroxy ethyl ether so that the product contains at least 1% by weight of

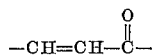

groups, the reaction being conducted at a temperature of from 60–200° C.

7. A process for the production of light-sensitive compounds which comprises reacting at a temperature of from 60–200° C. substantially equivalent amounts of hexamethylene diisocyanate and butane-1,4-diol with 4,4′-bis-hydroxy ethyl ether chalcone in an amount sufficient that the product contains at least 1% by weight of

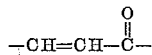

groups.

8. The polyurethane obtained by the process of claim 1.
9. The polyurethane obtained by the process of claim 5.
10. The polyurethane obtained by the process of claim 6.
11. The polyurethane obtained by the process of claim 7.

References Cited in the file of this patent

UNITED STATES PATENTS

| | | |
|---|---|---|
| 2,816,091 | Smith et al. | Dec. 10, 1957 |
| 2,824,084 | Unruh et al. | Feb. 18, 1958 |
| 2,861,972 | Mullet et al. | Nov. 25, 1958 |
| 2,948,706 | Schellenberg et al. | Aug. 9, 1960 |